July 15, 1952

P. R. BELL, JR 2,603,748

FREQUENCY DETECTOR

Filed June 21, 1946

INVENTOR.
PERSA R. BELL, JR.

BY

William D. Hall
ATTORNEY

Patented July 15, 1952 2,603,748

UNITED STATES PATENT OFFICE 2,603,748

FREQUENCY DETECTOR

Persa R. Bell, Jr., Oak Ridge, Tenn., assignor, by mesne assignments, to the United States of America as represented by the Secretary of War Application June 21, 1946, Serial No. 678,223

1 Claim. (Cl. 250—27.1)

This invention relates generally to electrical circuits and, more particularly, to frequency discriminator circuits.

In many applications of electronic circuits, some means is necessary for indicating changes in the frequency of an incoming signal. For this purpose, means have been devised which produce a direct current output which varies in magnitude and polarity to correspond to the deviation of the input frequency from a predetermined value. Some circuits previously utilized for this purpose give rise to distortion when a series of radio frequency pulses serves as the input signal. This distortion commonly takes the form of spikes or peaks at the beginning and end of each output video pulse.

It is, therefore, an object of the present invention to provide a frequency discriminator circuit which may be used with a pulse modulated radio frequency input signal. It is another object substantially to eliminate distortion from the video pulse output signal of this discriminator.

Figure 1:
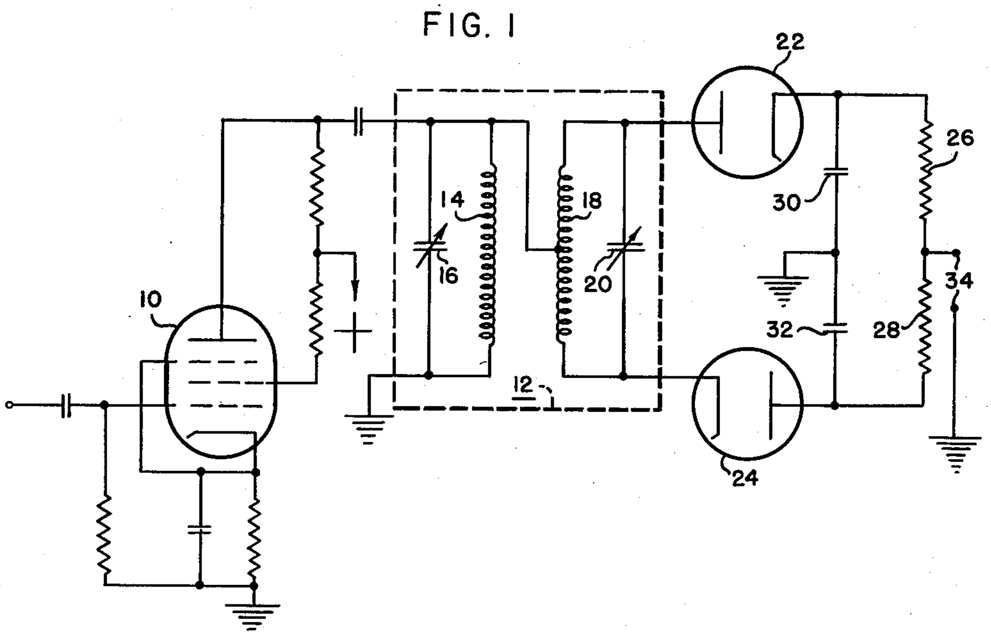
Figure 2A:
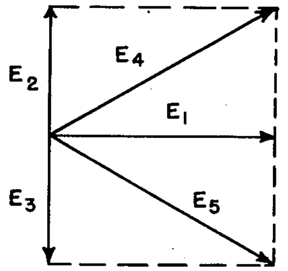
Figure 2B:
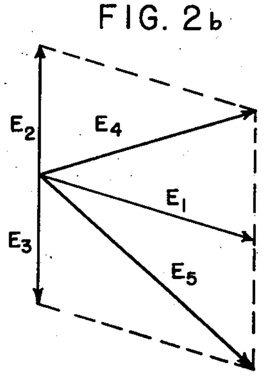

Other objects, features and advantages of this invention will suggest themselves to those skilled in the art, and will become apparent from the following description of the invention taken in connection with the accompanying drawing in which:

Fig. 1 is a schematic diagram of a circuit embodying the principles of the present invention; and Figs. 2*a* and 2*b* are vector diagrams showing the phase relations of the various voltages present in the circuit of Fig. 1.

Reference is made now more particularly to Fig. 1 in which pentode 10 and its associated circuit elements form the final intermediate frequency amplifier stage of the radio receiving system with which the present invention may be used. The intermediate frequency output voltage from the plate of pentode 10 is applied to a double-tuned intermediate frequency transformer 12 which constitutes the input circuit to the discriminator. The primary tuned circuit of transformer 12 comprises coil or winding 14 and variable capacitor 16, and the tuned secondary comprises coil or winding 18 and variable capacitor 20. These two circuits are both tuned to the desired intermediate frequency, and the coupling between coils 14 and 16 is loose. The ungrounded end of coil 14 is connected directly to the center tap of coil 18. The two terminals of the secondary of transformer 12 are connected respectively to the plate or anode of a diode 22 and to the cathode of a second diode 24. The cathode of diode 22 and the plate or anode of diode 24 are joined by the series combination of two substantially equal resistors 26 and 28. Capacitors 30 and 32, of substantially equal value, are connected respectively between the cathode of diode 22 and ground, and between the plate of diode 24 and ground. The video voltage developed with respect to ground at the junction point of resistors 26 and 28 is applied to output terminals 34.

For an understanding of the operation of the circuit of Fig. 1, reference may be had to the vector diagrams of Fig. 2. Fig. 2*a* represents the condition of resonance in which the radio frequency of the incoming signal is that to which the intermediate frequency transformer 12 is tuned. Under these conditions, the phase relationships are such that the voltage developed across capacitor 20 is 90° out of phase with the voltage across coil 14 of the tuned primary. Vector $E_1$ in Fig. 2*a* represents the voltages across coil 14. The voltages induced in the upper and lower halves of coil 18 with respect to the center tap of this coil are opposite in phase, and these are represented by vectors $E_2$ and $E_3$, respectively. Due to the direct connection between coils 14 and 18, the resulting voltages at the two ends of coil 18 are the vector sums of voltages $E_1$ and $E_2$ and of $E_1$ and $E_3$, respectively. These resultant voltages are represented by vectors $E_4$ and $E_5$, and are applied to diodes 22 and 24, respectively. For the condition of resonance, $E_4$ and $E_5$ are equal, and, hence, the voltages to which capacitors 30 and 32 are charged are equal, though opposite in polarity. When this is the case, terminals 34 are at ground potential, and the output voltage of the circuit is zero.

If the frequency of the incoming signal differs from the frequency to which transformer 12 is tuned, voltage $E_1$ will vary from its quadrature relation with voltages $E_2$ and $E_3$. If, for example, the incoming frequency is too low, the phase relations are as shown in Fig. 2*b*. In this case, $E_5$ is of a greater magnitude than $E_4$, and the charge on capacitor 32 will be larger than that on capacitor 30. The voltage at terminals 34 will then be negative with respect to ground.

If the incoming frequency is too high, the situation will be reversed, and $E_4$ will be larger than $E_5$, thus causing the voltage at terminals 34 to be positive with respect to ground.

The operation just described is very similar to the operation of the conventional frequency discriminator circuit which is well known in the art. A chief difference is that the output portions of the two halves of the circuit are balanced with respect to ground. The time constants of the two diode output circuits are equal, hence causing capacitors 30 and 32 to charge equally rapidly and eliminating the distortion from the output pulses.

While there has been described what is at present considered to be a preferred embodiment of this invention, it will be obvious to those skilled in the art that various changes and modifications may be made therein without departing from the spirit and scope of the invention.

The invention claimed is:

In combination, an electron discharge device having an anode, a cathode, and a control electrode, a source of positive potential relative to ground potential, means for connecting said cathode to ground; a resistor connecting said source to said anode, means for applying a frequency-modulated signal between said cathode and said control electrode, a double-tuned transformer tuned to the carrier frequency of said frequency-modulated signal, said transformer having a primary winding and a secondary winding, one end of said primary winding being connected at ground potential, the ungrounded end of said primary winding being directly connected to the mid-point of said secondary winding, a first capacitor connecting the ungrounded end of said primary winding to said anode, a first diode having its anode connected to one end of said secondary winding, a second diode having its cathode connected to the other end of said secondary winding, a second capacitor connected between the cathode of said first diode and ground, a third capacitor connected between the anode of said second diode and ground, two resistors connected, in series, between the cathode and said first diode and the anode of said second diode, and first and second output terminals connected, respectively, to the junction of said two resistors and to ground.

PERSA R. BELL, Jr.

REFERENCES CITED

The following references are of record in the file of this patent:

UNITED STATES PATENTS

| Number | Name | Date |
|---|---|---|
| 2,285,957 | Wheeler | June 9, 1942 |
| 2,309,481 | Summerhayes | Jan. 26, 1943 |
| 2,397,841 | Crosby | Apr. 12, 1946 |
| 2,404,026 | Beard | July 16, 1946 |
| 2,413,913 | Duke | Jan. 7, 1947 |
| 2,413,977 | Koch | Jan. 7, 1947 |
| 2,415,468 | Webb | Feb. 11, 1947 |